(12) United States Patent
Boyd et al.

(10) Patent No.: US 9,400,867 B2
(45) Date of Patent: Jul. 26, 2016

(54) METHOD AND SYSTEM FOR MONITORING AND REPORTING EQUIPMENT OPERATING CONDITIONS AND DIAGNOSTIC INFORMATION

(75) Inventors: Cindy L. Boyd, Houston, TX (US);
Majdi Rajab, Houston, TX (US);
Anatoly Borodaev, Kyiv (UA);
Vladimir Fedishov, Komsomolsk (UA)

(73) Assignee: CBM Enterprise Solutions, LLC, Houston, TX (US)

( * ) Notice: Subject to any disclaimer, the term of this patent is extended or adjusted under 35 U.S.C. 154(b) by 933 days.

(21) Appl. No.: 13/696,419

(22) PCT Filed: Sep. 9, 2012

(86) PCT No.: PCT/US2012/054343
§ 371 (c)(1),
(2), (4) Date: Nov. 6, 2012

(87) PCT Pub. No.: WO2013/036897
PCT Pub. Date: Mar. 14, 2013

(65) Prior Publication Data
US 2014/0074409 A1    Mar. 13, 2014

(51) Int. Cl.
| | |
|---|---|
| G07C 3/00 | (2006.01) |
| G01D 3/00 | (2006.01) |
| G01D 21/00 | (2006.01) |
| G06F 17/40 | (2006.01) |
| G06F 19/00 | (2011.01) |
| G01D 3/08 | (2006.01) |
| G05B 19/418 | (2006.01) |
| G05B 23/02 | (2006.01) |
| G06F 11/30 | (2006.01) |

(52) U.S. Cl.
CPC *G06F 19/00* (2013.01); *G01D 3/08* (2013.01); *G01D 21/00* (2013.01); *G05B 19/4183* (2013.01); *G05B 23/0283* (2013.01); *G07C 3/00* (2013.01); *G05B 2219/31282* (2013.01); *G05B 2219/31319* (2013.01); *G05B 2219/32235* (2013.01); *G06F 11/3013* (2013.01); *G06F 11/3058* (2013.01); *G06F 17/40* (2013.01); *Y02P 90/10* (2015.11); *Y02P 90/18* (2015.11)

(58) Field of Classification Search
None
See application file for complete search history.

(56) References Cited

U.S. PATENT DOCUMENTS

| | | | | |
|---|---|---|---|---|
| 2,883,255 | A | * | 4/1959 | Anderson ............... B41J 11/36 340/518 |
| 3,321,613 | A | * | 5/1967 | Searle .................... G07C 3/005 702/182 |
| 6,298,308 | B1 | | 10/2001 | Reid et al. |

(Continued)

*Primary Examiner* — Edward Cosimano
(74) *Attorney, Agent, or Firm* — The Petruzzi Law Firm; James D. Petruzzi

(57) ABSTRACT

A method and system (20) is provided for condition based monitoring reliability maintenance capabilities for an asset (70), such as one or more machines, by establishing a network including of a sensor (60) or a plurality of sensors installed, temporarily or in generally fixed locations, on asset (70), wherein sensor (60) provides time sequenced operational information in the form of data based on vibrations, temperature, electrical signals, or other operating conditions. Sensors (60) are connected to a local controller (40) which transmits the data via a local or wide area network (45), either through wired or wireless communication paths, in data packets, each containing divided portions of the operational information. The data packets are mapped and stored into multiple, dedicated databases for ease of retrieving and analyzing the data. Preferably, a cloud-based storage arrangement (120) is employed to storing the mapped data.

16 Claims, 16 Drawing Sheets

(56) References Cited

U.S. PATENT DOCUMENTS

| | | |
|---|---|---|
| 6,526,323 B1 | 2/2003 | Myajima et al. |
| 6,839,597 B2 | 1/2005 | Hattori et al. |
| 6,853,959 B2 | 2/2005 | Ikeda et al. |
| 6,889,096 B2 | 5/2005 | Spriggs et al. |
| 6,963,817 B2 | 11/2005 | Ito et al. |
| 7,139,681 B2 | 11/2006 | Yoshie et al. |
| 7,216,007 B2 | 5/2007 | Johnson |
| 7,328,130 B2 | 2/2008 | Wiles et al. |
| 7,363,195 B2 | 4/2008 | Yetter, Jr. et al. |
| 7,392,293 B2 | 6/2008 | Leonik |
| 7,398,186 B2 | 7/2008 | Wiles et al. |
| 7,684,876 B2 | 3/2010 | Grgic |
| 7,720,639 B2 | 5/2010 | Kirchner et al. |
| 7,791,480 B2 | 9/2010 | Skorpik et al. |
| 7,797,062 B2 | 9/2010 | Discenzo et al. |
| 8,055,612 B2 * | 11/2011 | Barnett ............ H04L 41/147 707/609 |
| 8,204,717 B2 | 6/2012 | McLaughlin et al. |
| 8,209,203 B1 | 6/2012 | Marsh et al. |
| 8,219,451 B2 | 7/2012 | Kreidler et al. |
| 8,521,684 B2 * | 8/2013 | Barnett ............ H04L 41/147 707/609 |
| 9,021,304 B2 * | 4/2015 | Tonouchi ............ G06F 11/0781 714/25 |
| 2001/0003804 A1 | 6/2001 | Papadopoulos et al. |
| 2002/0083773 A1 | 7/2002 | Ben-Romdhane |
| 2003/0120402 A1 | 6/2003 | Jaw |
| 2005/0050098 A1 * | 3/2005 | Barnett ............ H04L 12/2602 |
| 2005/0192678 A1 | 9/2005 | May et al. |
| 2007/0162957 A1 | 7/2007 | Bartels |
| 2007/0208434 A1 | 9/2007 | Yeh et al. |
| 2007/0293952 A1 | 12/2007 | Callaghan et al. |
| 2008/0288543 A1 * | 11/2008 | Barnett ............ H04L 41/147 |
| 2009/0204232 A1 | 8/2009 | Guru et al. |
| 2009/0210071 A1 | 8/2009 | Agrusa et al. |
| 2010/0049336 A1 | 2/2010 | Colombo et al. |
| 2010/0114810 A1 | 5/2010 | Hoyte et al. |
| 2010/0257228 A1 | 10/2010 | Staggs et al. |
| 2011/0196539 A1 | 8/2011 | Nair et al. |
| 2012/0096146 A1 * | 4/2012 | Barnett ............ H04L 41/147 709/224 |
| 2013/0042147 A1 * | 2/2013 | Tonouchi ............ G06F 11/0781 714/37 |
| 2013/0346377 A1 * | 12/2013 | Barnett ............ H04L 41/147 707/692 |

* cited by examiner

METHOD AND SYSTEM FOR MONITORING AND REPORTING EQUIPMENT OPERATING CONDITIONS AND DIAGNOSTIC INFORMATION

CROSS REFERENCE TO RELATED APPLICATIONS

This application claims the benefit of U.S. Provisional Patent Application Ser. No. 61/533,188 filed on 10 Sep. 2011, entitled "Method and Apparatus For Monitoring and Reporting Equipment Operating Conditions and Diagnostic Information," which is incorporated herein by reference.

BACKGROUND OF THE INVENTION

The present invention pertains to the field of predictive and reliability centered system maintenance and, more specifically, to a method and apparatus for monitoring and reporting equipment operating conditions and diagnostic information. More particularly, the present invention relates to a condition based monitoring network and method which employs local and wide area networks to provide operating condition data to local and remote users with the necessary software to read and analyze data, as well as providing a user interface.

Operators of machinery must balance the often competing concerns of maximizing operational time and minimizing maintenance costs. On high-value equipment, operators typically invest in real-time monitoring systems, while the remaining "balance of plant" equipment is subject to periodic manual inspection, often using portable equipment. Manual inspection is typically conducted according to some sort of predefined time schedule, or when a significant problem has been identified.

Manual inspection incurs four significant problems. First, manual inspection generally involves risks associated with the environment and operating conditions of the equipment. Second, manual inspection can involve a significant waste of resources in connection with personnel travelling between various pieces of equipment in various locations, as well as time spent collecting and analyzing data. Third, manual inspection is generally not executed by personnel who are experts in the various fields of concern, e.g., vibration, thermodynamics, and other operating conditions. Finally, data collected is inconsistent due to variances related to the method of inspection, e.g., sensor placement and inspections being performed at irregular intervals.

Beyond the concerns associated with conducting manual inspections, it turns out that manual inspections are generally not extremely effective at addressing maintenance concerns typical to balance of plant equipment. Often, serious maintenance issues and catastrophic failures of balance of plant equipment are associated with human error during routine maintenance, e.g., insufficient lubrication, improperly installed parts, etc. These issues manifest in a time period that is frequently too short to be addressed by periodic manual inspections. However, real-time monitoring is not a viable solution for the balance of plant equipment due to costs, location and other concerns. To this end, there is a gap in the ability to effectively monitor and evaluate the condition of operating equipment.

As can be seen from the above discussion, there is considered to be a need in the art for a cost elective, condition based monitoring solution that will provide an operator with the ability to address these issues.

SUMMARY OF THE INVENTION

The present invention is directed to a particular approach to conducting predictive and reliability centered maintenance. The present invention provides to system to monitor the operating condition of "balance of plant" equipment via sensors that are strategically installed, either permanently or temporarily, on equipment to collect data on operating conditions, such as vibration or temperature data. A controller manages the sensors and gathers data collected for transmission via a wireless or wired network. Data is analyzed by software and transmitted, along with the results of the analysis, via a user interface or a plug-in which interfaces with a maintenance management system or operator control system.

More specifically, the system and method for condition based monitoring of an asset, such as a machine, in accordance with the invention senses time sequenced operational information about the asset through at least one sensor associated with the asset, wherein the operational information encompasses a plurality of time sequenced operational parameters of the asset. The operational information is transferred to a storage device and later transmitted, as a plurality of data packets each containing only as divided portion of the operational information from the storage device into respective mapped locations within multiple, dedicated databases provided in at least one remote storage device. When data analysis is desired, select ones of the plurality of data packets are retrieved from one or more of the mapped locations and the time sequenced operational information from the select ones of the plurality of data packets is analyzed, such as with a portable computer containing user specific software, in diagnosing a predetermined operational feature of the asset.

A primary advantage of the invention is to provide a system for managing and analyzing large quantities of data that is scalable.

Another advantage of the invention is to provide a system for monitoring systems and machinery on to near real time basis.

Another advantage of the invention is to provide a user configurable data retrieval system for monitoring and assessing system operating conditions.

Another advantage of the invention is to allow for distributed storage of data in remote locations, including "cloud" storage.

Another advantage of the invention is to provide a method for expert access to data representative of systems for analysis.

Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

The drawings constitute a part of this disclosure and include exemplary embodiments to the invention, which may be embodied in various forms. It is to be understood that, in some instances, various aspects of the invention may be shown exaggerated or enlarged to facilitate an understanding of the invention.

DETAILED DESCRIPTION OF THE PREFERRED EMBODIMENTS

Detailed descriptions of preferred embodiments of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art how to employ the present invention in virtually any appropriately detailed system, structure or manner.

Figure 1:
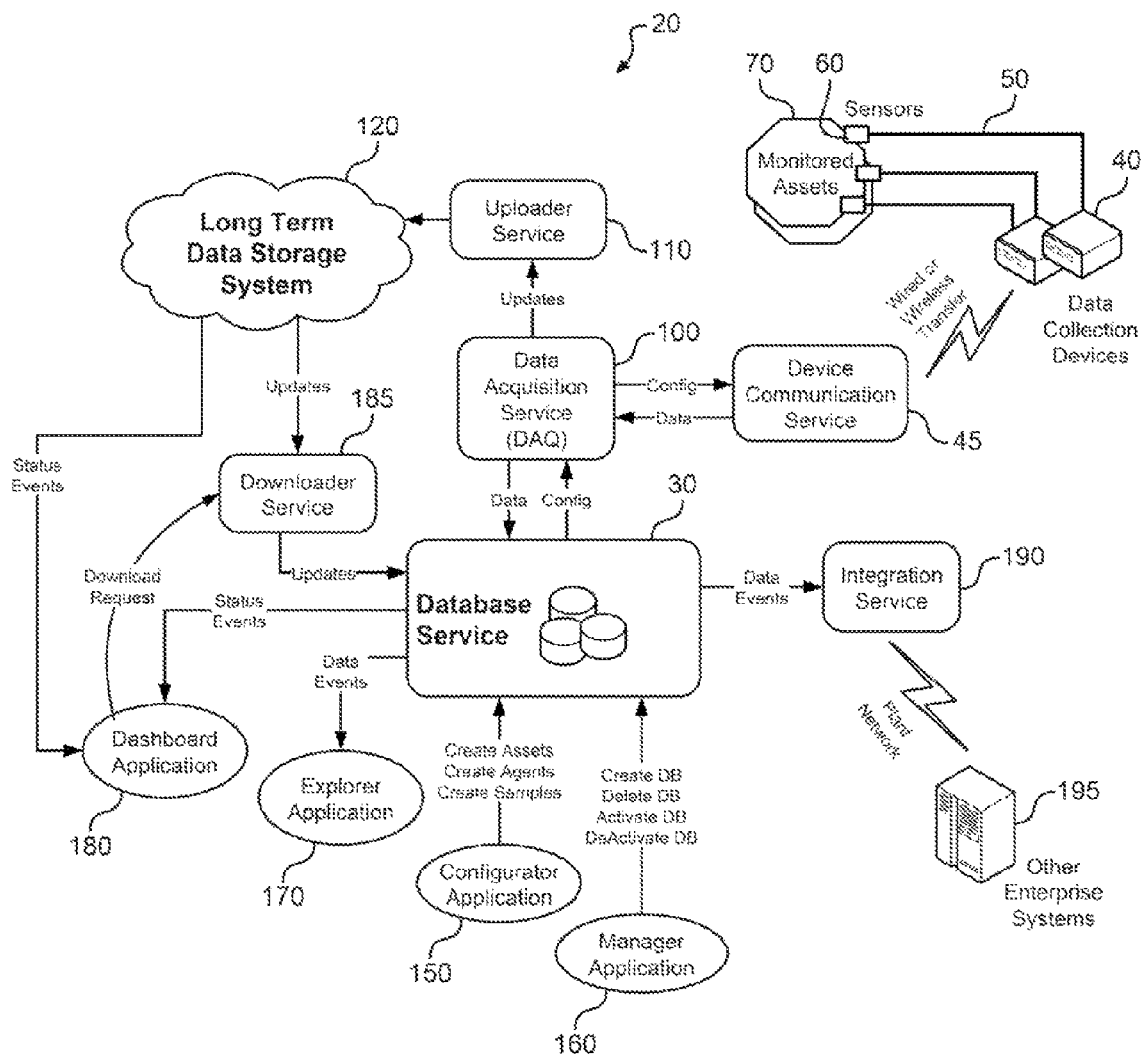
FIG. 1 is as block diagram showing system components according to a preferred embodiment of the invention.
Figure 3:
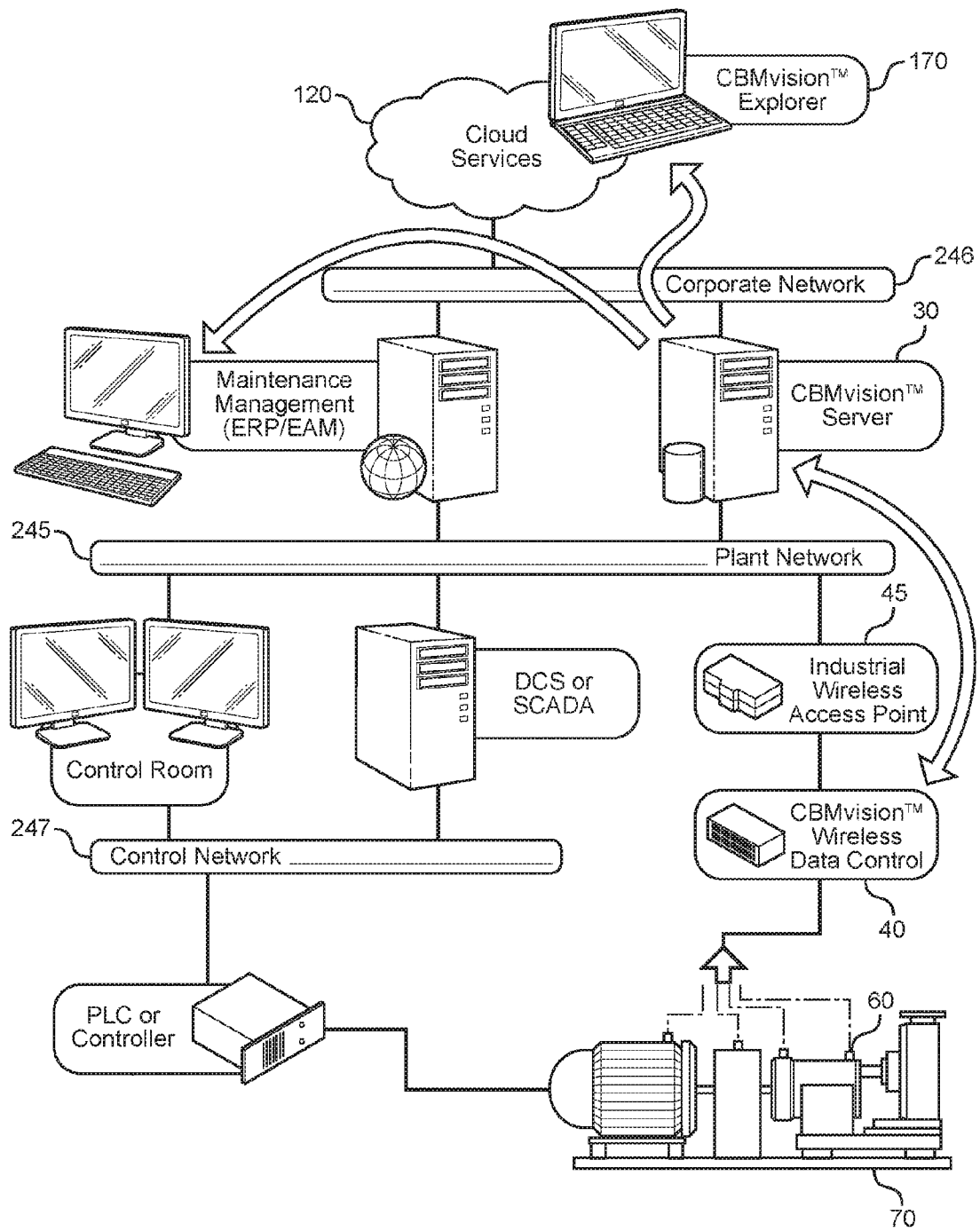
FIG. 3 is a schematic diagram of the system of FIG. 1.

With initial reference to FIG. 1, there is shown an overall system 20 for monitoring and reporting equipment operating conditions and diagnostic information. As depicted, a database service including a first, preferably local database or databases 30 provides an area to store information. Data is initially collected by data collection devices 40 which are linked by communication wires to individual sensors 60 attached to a monitored asset 70 which may be as group of machines or various pieces of equipment or infrastructure. Each sensor 60, or plurality of sensors, installed on a given piece of equipment or asset 70 is connected to data collection devices which may constitute controllers for providing power to sensors 60 and determine the frequency of data collection. Data collection devices 40 also collect data, such as time sequenced operational information from sensor 60, for transmission via as network or device communication service 45 that is then passed on to a data acquisition service (DAQ) processor 100 and database or databases 30. The controller is connected to a network, such as a wide area network (WAN) or a local area network (LAN), via either as wired connection or a wireless connection. Data is transmitted via as transmitter such as DAQ processor 100 to a database or a plurality of databases 30. DAQ processor 100 is responsible for distributing data to the database or databases 30 and from the database or databases 30 to the next level of data distribution or management. DAQ processor 100 receives data from data collection devices 40 and matches a data source with an appropriate data target(s) for storage and analysis. DAQ processor 100 analyzes the data according to a diagnostic configuration associated with the data target(s). DAQ processor 100 then divides the operational information into a plurality of data pockets each containing a portion of the operational information and transmits the plurality of data pockets from local storage device, e.g., database or databases 30 into respective mapped locations in multiple dedicated databases provided in at least one remote storage device, e.g., long term storage 120 and stores analysis results on the appropriate database or databases. Results from database or databases 30 are transmitted via an object linking and embedding for process control (OPC) service to control systems, such as supervisory control and data acquisition (SCADA) or a distributed control system (DCS) via DAQ processor 100 as best seen in FIG. 3. Results from the database are also transmitted via a subscription uploader 110 to long term storage (e.g., cloud services, remote storage, or local storage) 120. Data from long term storage 120 is transmitted to the database at step 30 via a subscription downloader 185. Database information is also accessible to the user via a user interface constituted by various applications 150-180 represents software configured to retrieve select ones of the plurality the data packets from one or more of the mapped locations, and analyzing the time sequenced operational information from the select ones of the plurality of data packets in analyzing a predetermined operational feature of the asset as described in more detail below. The user interface further enables the user to configure the system and manage the database or databases 30.

Design Principle Details

Principle A: A graph of objects is used to represent a collection of assets, measurements, processing agents and the relationships between them as shown in FIG. 2A.

Figure 2A:
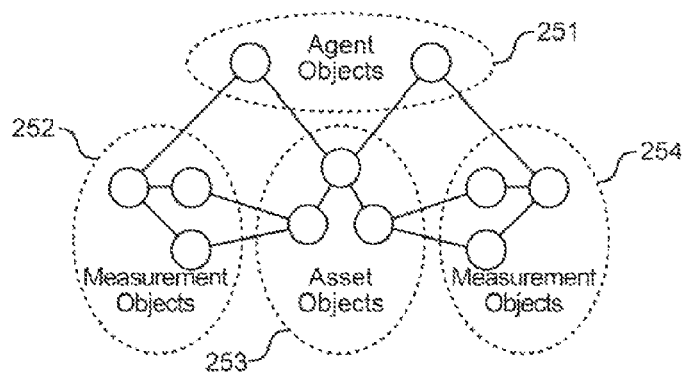
FIGS. 2A-2C are graphs representing a collection of system components.
Figure 2B:
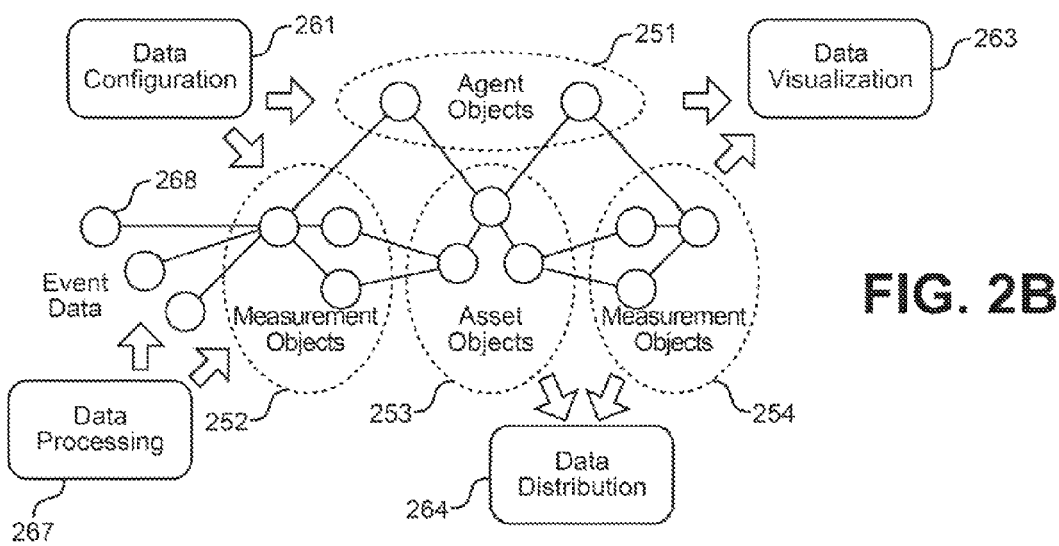

FIG. 2A shows agent objects 251 interconnected with several other objects such as measurement objects 252, asset objects 253 and measurement objects 254. Generally, FIG. 2A shows how data may be stored and retrieved as objects. FIG. 2B is similar to FIG. 2A but adds a configuration 261 which may be imposed on the database, data visualization 263 which may be obtained from the database, data processing 267 and data distribution 254 which may be obtained from the database and event data 268 is also depicted.

The system may use the MIMOSA object schema for many object primitives (see http://www.mimosa.org/?q=resources/specs for more information which is incorporated herein by reference). Other protocols or object oriented databases may be employed well known to those of skill in the art.

Principle B: The same graph of objects is used throughout the system to support different activities: mainly configuration, data processing, data distribution, and data visualization as shown in FIG. 2B.

Figure 2C:
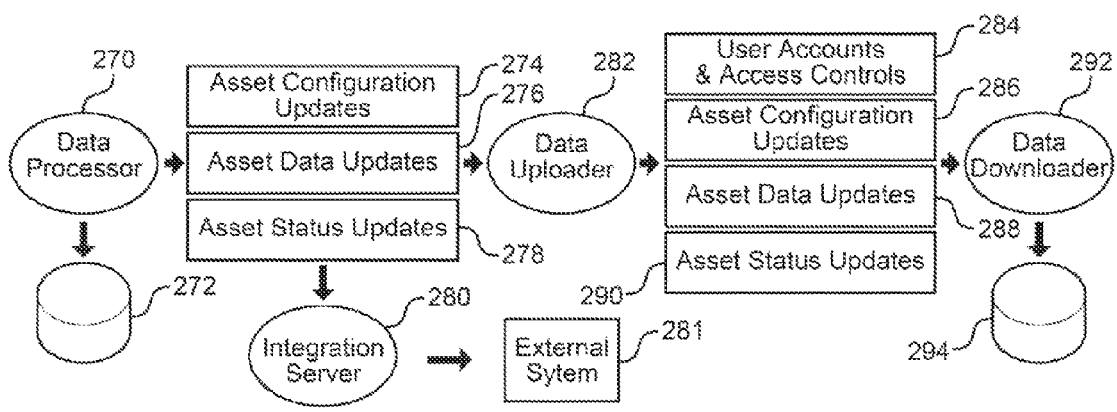

Principle C: Data is disassembled for distribution or long term storage as shown in FIG. 2C: The data processor 270 will send data either to local storage 272 or process the data according to asset configuration updates 274, asset data updates 276 and asset status updates 278. From there data can be integrated in a server 280 and then an external system 281 or the data may be sent via a data uploader 282 to storage which may store additional information such as user accounts and access controls 284, asset configuration updates 286, asset data updates 288 and asset status updates 290. When information needs to be retrieved a data downloader 292 will bring the data back to storage 294.

Principle D: Users of the data can query for a specific range of data, download a collection of updates, and reassemble the updates into a dataset that provides a specific utility.

Principle E: Pluggable framework that allows for system extension of data collection, data processing, data exchange, and data visualization capabilities.

Use Case Map

Installation and Setup a) Design principle (A) allows a user to create any asset structure that represents the monitored assets, the sensor assets, the data acquisition assets, and the physical connections between them. This provides the flexibility to model the physical representation of the monitored installation in an intuitive way with limited training.

b) Design principles (B) and (E) allow the user to use different tools to create a complete configuration that contains measurement and processing objects without being aware of their internal structure. This allows lower-skill personnel to complete complex configuration tasks that would typically require an expert.

c) Design principle (E) gives users the ability to import assets from external systems or to create them from templates. This simplifies tedious or repetitive configuration work.

Data Collection, Data Processing, and Data Distribution a) Design principles (B) and (E) allow the data collection sub-system to convert proprietary data structures received from proprietary data acquisition devices to be converted into standard objects, preferably standard MIMOSA objects. This allows the consumers of data to be data acquisition system agnostic.

b) Design principles (B) and (E) allow the data processing sub-system to invoke embedded or external diagnostic modules and store diagnostic results preferably as MIMOSA measurement event objects. This allows for the system to leverage different diagnostic systems simultaneously and to be extended with limited impact on other sub-systems.

c) Design principles (C) and (E) allow the system to deliver data to multiple target systems that have unique data formats. This allows for the system to satisfy many integration and data distribution requirements.

Data Access, Data Selection, and Data Visualization a) Design principles (C) and (D) allow users to search and retrieve data for a specific timeframe or a timeframe in which an asset anomaly is present or a specific data type. This allows users to explore data on computers that have limited capabilities.

b) Design principles (C) and (D) allow the owner of the data to choose specific data that they would like to share with other local or remote users. This gives data owners the flexibility to manage data access control per asset and per timeframe.

Extending the System to Add a New Device and a New Diagnostic Module a) Design principles (A), (B), and (E) allow a software developer to add a new asset type and a new diagnostic agent type that represent the new data collection device and the new diagnostic engine. Major system enhancements can be delivered without impacting the core data management and data distribution frameworks.

Turning back to FIG. 1, there is shown a block diagram of the overall system 20 according to a preferred embodiment of the invention. FIG. 1 shows the main components of system 20, including the controller which consists of a processor, databases or databases 30, a wireless and/or wired communication service 45, and connectors 50 for sensor leads. The controller manages operation of sensors 60 and receives data from connected sensors 60. Data collected relates to operating condition of equipment or monitored assets 70 including vibration, temperature, and electrical signals, among other sensed data. When configured to collect analog data, the controller includes an analog to digital converter in data collection devices 40.

As seen in FIG. 3 monitored assets 70 are preferably machines equipped with sensors 60 that collect information. A data acquisition device preferably is constituted by a data collection device 40 and communications service 45 that transmits data to local database or databases 30 via a network 245. A processor preferably constituted by DAQ processor 100 consists of software that is responsible for distributing data to the database or databases 30 and from database or databases 30 to the next level of data distribution or management such as corporate network 246 or control network 247 or a large network of publically accessed computers such as the internet. DAQ processor 100 receives data from controllers and matches the data source with the appropriate data target(s) for storage and analysis. DAQ processor 100 is preferably configured to divide the information into small data packets, send the data packets from local database or databases 30 to multiple databases in long term storage 120 containing information from other machines, and develop mapping information regarding the location of the data packets. DAQ processor 100 analyzes the data according to a diagnostic configuration associated with the data target(s). DAQ processor 100 then stores analysis results on the appropriate database or databases 30. An uploader 110 service consists of software that is responsible for facilitating transfer of data between DAQ processor 100 and long term storage 120. A downloader 185 consists of software that is responsible for facilitating transfer of data between long term storage 120 and database or databases 30 to allow monitored asset 70 to be diagnosed based on the data packets retrieved from long term storage 120.

The user interface (150-180) consists of at least one application or a piece of client software such as explorer 170 discussed in more detail below and configured to retrieve the data packets by using the mapping information and diagnose machine or monitored asset 70 using the information in the data packets retrieved from long term storage 120. The user interface includes a configurator 150 which allows the user to establish operating parameters for the present invention and provides a guide for physical installation, and preferably includes a data visualization component which allows a user to view data and analysis results from the database or databases 30 and/or a manager 160 which allows the user to manage the database or databases 30. The details of the operation each component is described more fully below.

Operation of the System

At a prescribed time or interval, the controller energizes one or more sensors 60. Each sensor 60 collects data, such as time domain sampling data sets from an accelerometer for vibration data, which is transmitted to the controller. The controller gathers data from the sensor or sensors 60 which are connected to the controller for a designated period of time before de-energizing the sensor or sensors 60 which are connected to the controller. The controller then transmits the collected data set or data sets via a wired or wireless network, WAN or LAN in device communication service 45, to DAQ processor 100. DAQ processor 100 receives data from the controller(s) and matches the data source with the appropriate data target(s) for storage and analysis. DAQ processor 100 analyzes the data according to a diagnostic configuration associated with the data target(s). DAQ processor 100 then stores analysis results on the appropriate database or databases 30. Database or databases 30 provide access to the data and analyses of the data stored locally, remotely, or via long term storage 120 via the user interface such as explorer 170.

In an enterprise setting, a plurality of "balance of plant" equipment or assets 70 are equipped with sensors 60 as necessary and data collection device 40. Each data collection service 40 connects to the network, either LAN or WAN through device communication service 45. Database or databases 30 are available to maintenance personnel and appropriate specialists to analyze the data and make maintenance decisions regarding "the balance of plant" equipment.

Figure 4A:
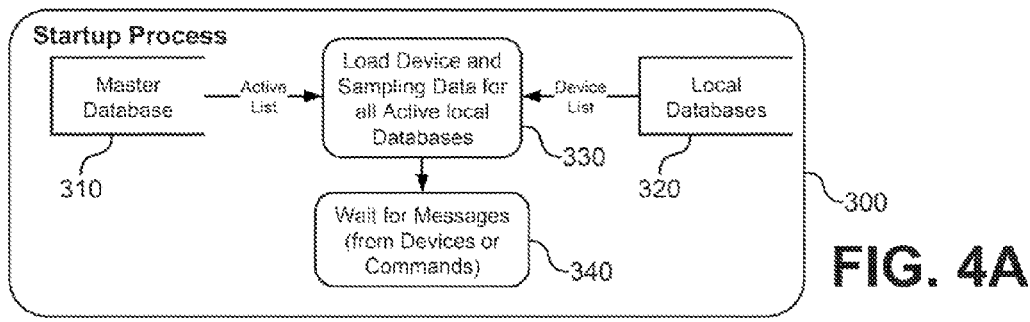
FIGS. 4A and 4B are flow charts showing process steps for a data acquisition service according to a preferred embodiment of the invention.
Figure 4B:
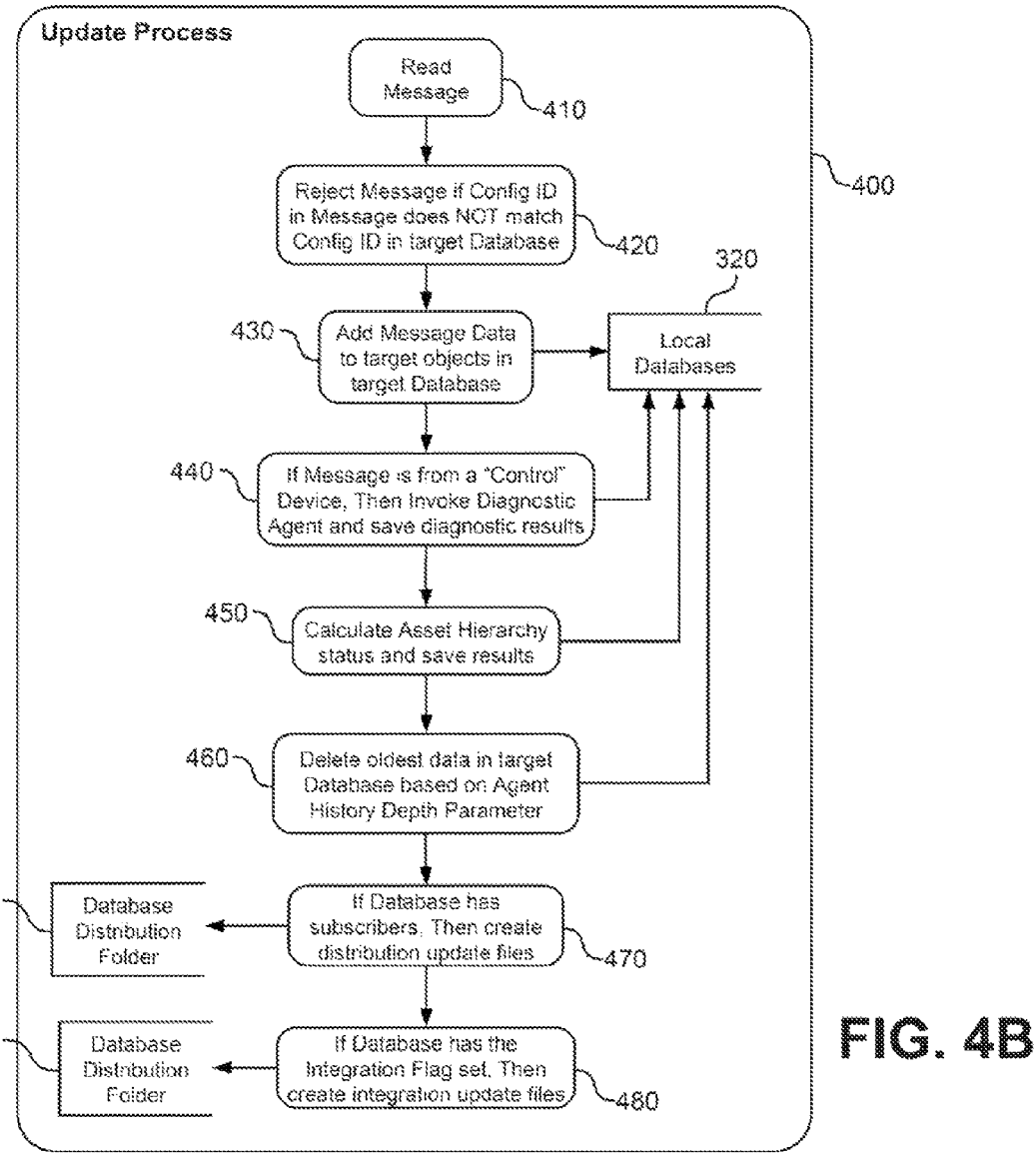

Step Processor—See FIGS. 4A and 4B for a flow chart of the process steps for DAQ Processor 100.

DAQ Processor 100 is a single instance background program that will Identify sources of data (Startup Process 300); and Facilitate data flow (Update Process 400).

Startup Process

In startup process 300 (FIG. 4A), DAQ Processor 100 retrieves the list of active databases from a Master Database 310. From each active database, DAQ Processor 100 obtains device list at 330. DAQ Processor 100 constructs a device database map to determine data processing channels. DAQ Processor 100 queries each device to obtain the data collection schedule and verities data collection is current according to each device's respective schedule stored in local databases 320. DAQ Processor 100 then monitors the network for messages at 340.

Update Process

In update process 400 (FIG. 4B), upon receiving a message 410 (from a device or other software component), DAQ Processor 100 identities the message type and verities the configuration ID contained in the message against the configuration ID in the target database(s) at step 420. If configuration IDs do not match, the message is rejected. The message data is added at step 430 to the target objects in the target database in local databases 320. When appropriate, DAQ Processor 100 will invoke a diagnostic agent at 440 to analyze data included in a message and save the diagnostic results as well as the data in local databases 320. DAQ Processor 100 calculates the asset hierarchy status for the local database(s) at step and saves the results on the local database(s) 320. Based upon the history depth parameter, the DAQ Processor 100 deletes at step 450 the oldest data in the local database(s) 320. DAQ Processor 100 evaluates the properties of the database, creates appropriate update files at 470, and saves the file to the database distribution folder 475. If an integration flag is set at 480 then integration update files are reset to folder 415.

Figure 5:
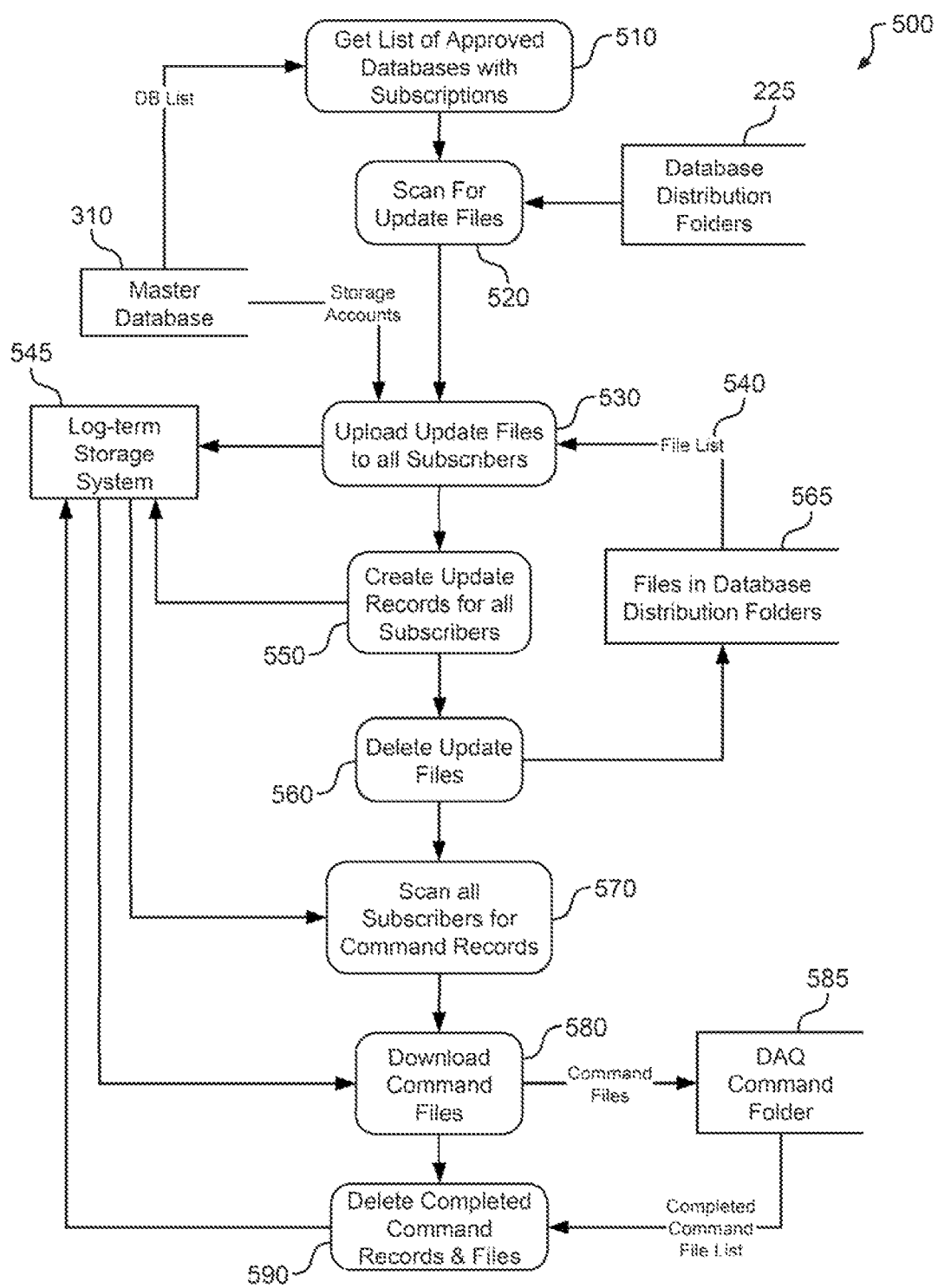
FIG. 5 is a flow chart showing process steps for an uploader program according to a preferred embodiment of the invention.

CBM Uploader Description—See FIG. 5 for a flow chart of the process steps of an uploader 500.

Uploader 500 is a single-instance application that will deliver databases and database updates from the owners of the database to subscribers and Download commands from subscriber to the owner of the database. Uploader 500, at step 510, gets a list of approved databases that have subscriptions. Then, at step 520, uploader 500 scans for update files from various database distribution folders 225. At step 530 all updated files are uploaded to all subscriber and placed in long term storage system 545. Master database 310 is provided with a database list to allow it to provide a list of approved databases with subscriptions. At step 550 update records are created for all subscribers and also placed in long term storage system 545. Updated files are then deleted at 560 and the remaining files in database distribution folders 565 are used to create a file list 540 of those files present after the update. Next uploader 500 scans all subscribers for command records at step 570 and downloads command files at 580 from long term storage system 545. Command files are also placed in a DAQ command folder 585. Once all the processes are completed their command files and record files are deleted at 590 and the process ends.

An application saves a file that describes a given task for the uploader 500 to the Output folder of a given database related to the application. This task file has a special format (e.g., XML) and extension (e.g., UPLOADTASK). The uploader watches the Output folders of all databases (DB) that have subscriptions for new tasks and processes them.

Each task describes the one event to send to subscribers. Sending an event means uploading a file(s) to a storage device or service and saving a corresponding event record to subscriber's account in the storage DB. Each event record contains information such as the update type, the reference to uploaded file (if any) and the serialized object that specifies the information about update's content. For examples, see the list of update types in Table 1.

TABLE 1

| Type | Description | File | Update's Content Info |
|---|---|---|---|
| Database | The database to install on subscriber's machine | DIAG.YAP file from the database folder | 1. Fully-qualified name of the database<br>2. The size of the file.<br>3. DIAG.YAP file's URL.<br>4. The hierarchy of machines taken from the Database Profile.<br>5. The version of the database schema. |
| Measurement Events Update | The update that contains new recommendations, trend, spectrum and time-wave measurement events. | MAIN FILE. A file that contains new trend measurement events, diagnostic recommendations and stubs of spectrums and time-wave measurement events. Spectrums and time-wave stubs are empty spectrum and time-wave measurement events (with empty arrays of data). | 1. MAIN FILE'S URL<br>2. The size of the MAIN FILE.<br>3. SPECTRUM FILE'S URL.<br>4. The size of the SPECTRUM FILE.<br>5. TIMEWAVE FILE'S URL.<br>6. The size of the TIMEWAVE FILE. |

TABLE 1-continued

| Type | Description | File | Update's Content Info |
|---|---|---|---|
| | | SPECTRUM FILE. A file that contains new spectrum measurement events. TIMEWAVE FILE: A file that contains new time-wave measurement events. | |
| Alarm Regions Update | The alarm region changes | File that contains database configuration changes. | The URL of the alarm region changes file. The size of a file. |
| Machine Status | The summary status of machines | <NO FILE> | Machine UID. The name and UID of the diagnostic agent that is the provider of the status. Machine alarm status that specifies the alarm type of most critical alarm of the machine (if any). |

Figure 6A:
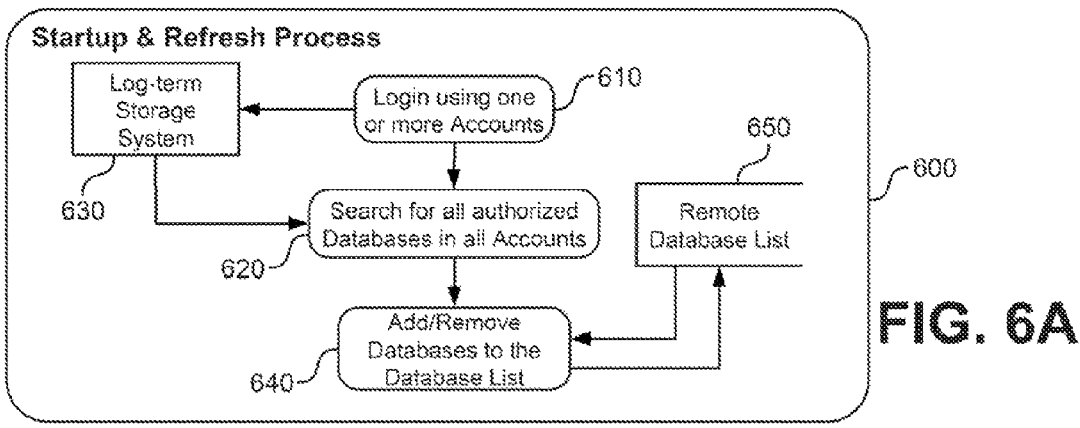
FIGS. 6A-6C are flow charts showing the process steps for a downloader program according to a preferred embodiment of the invention.
Figure 6B:
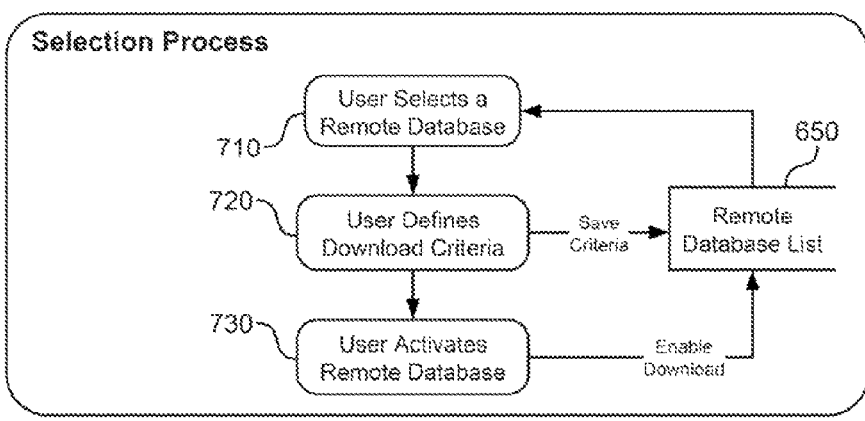

Downloader Description—See FIG. 6 for a flow chart of the process steps for a downloader 185.

Figure 6C:
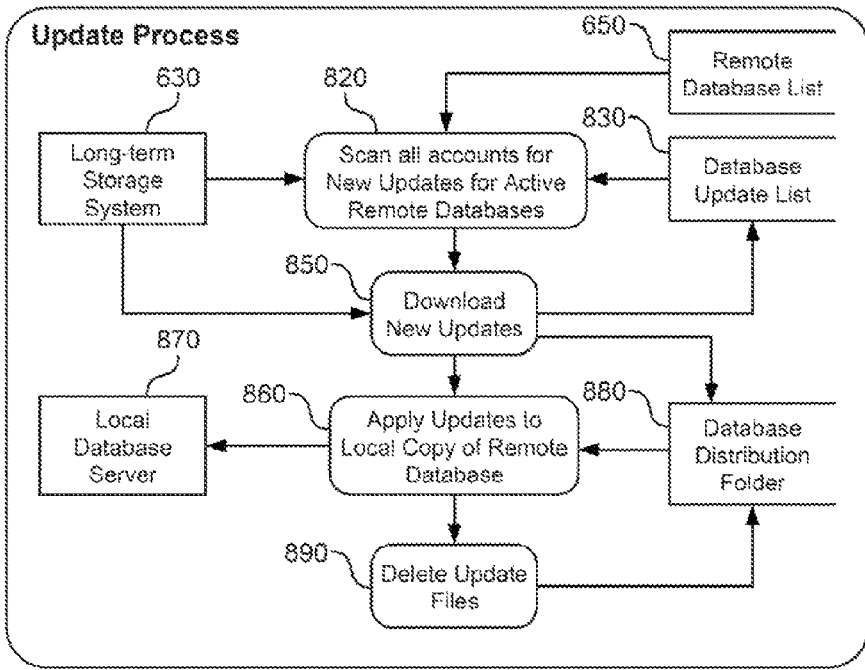
Figure 7A:
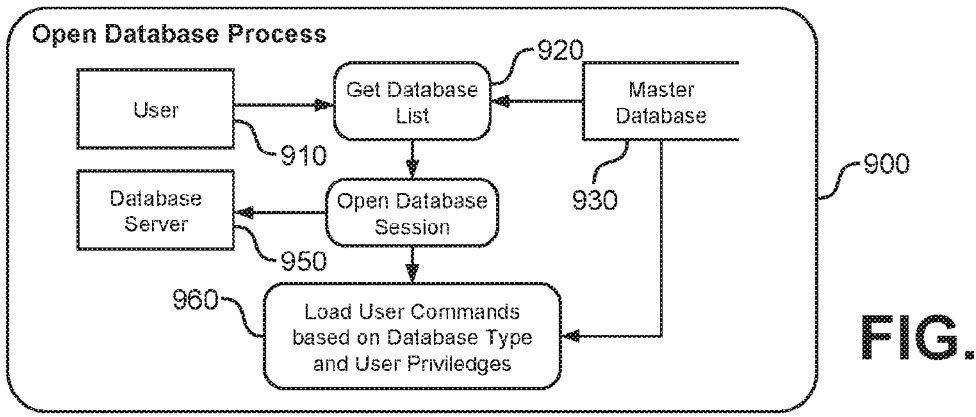
FIGS. 7A-7F are flow charts showing the process steps for a configurator program according to a preferred embodiment of the invention.
Figure 7B:
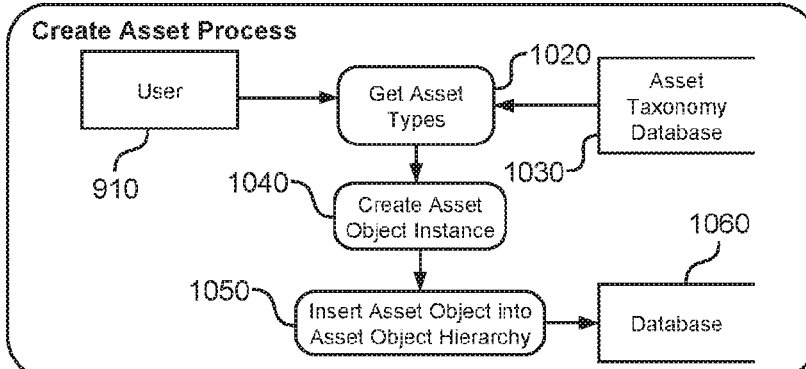
Figure 7C:
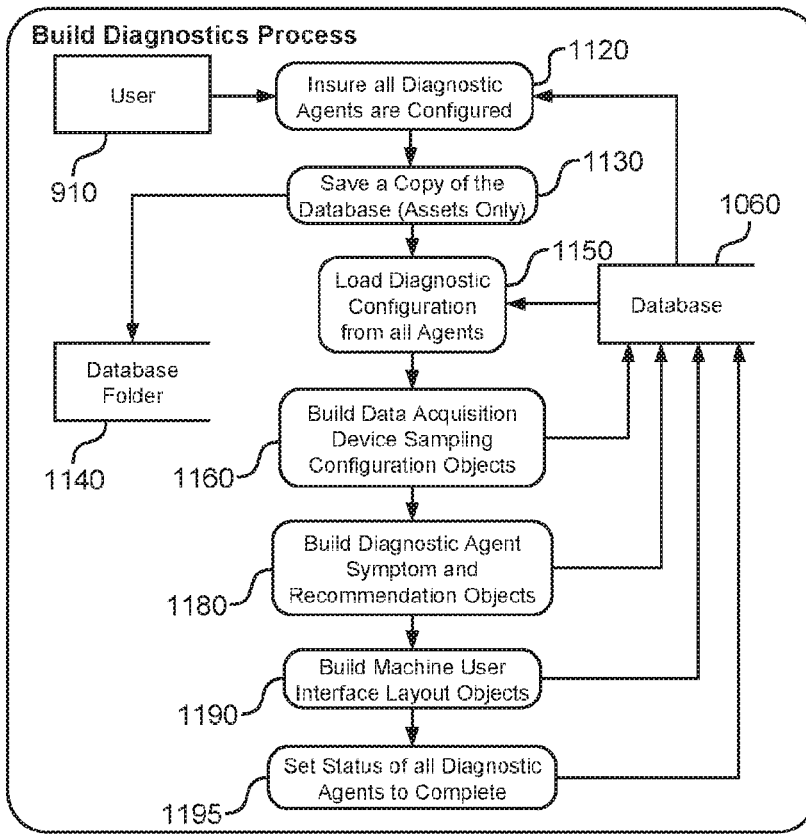
Figure 7D:
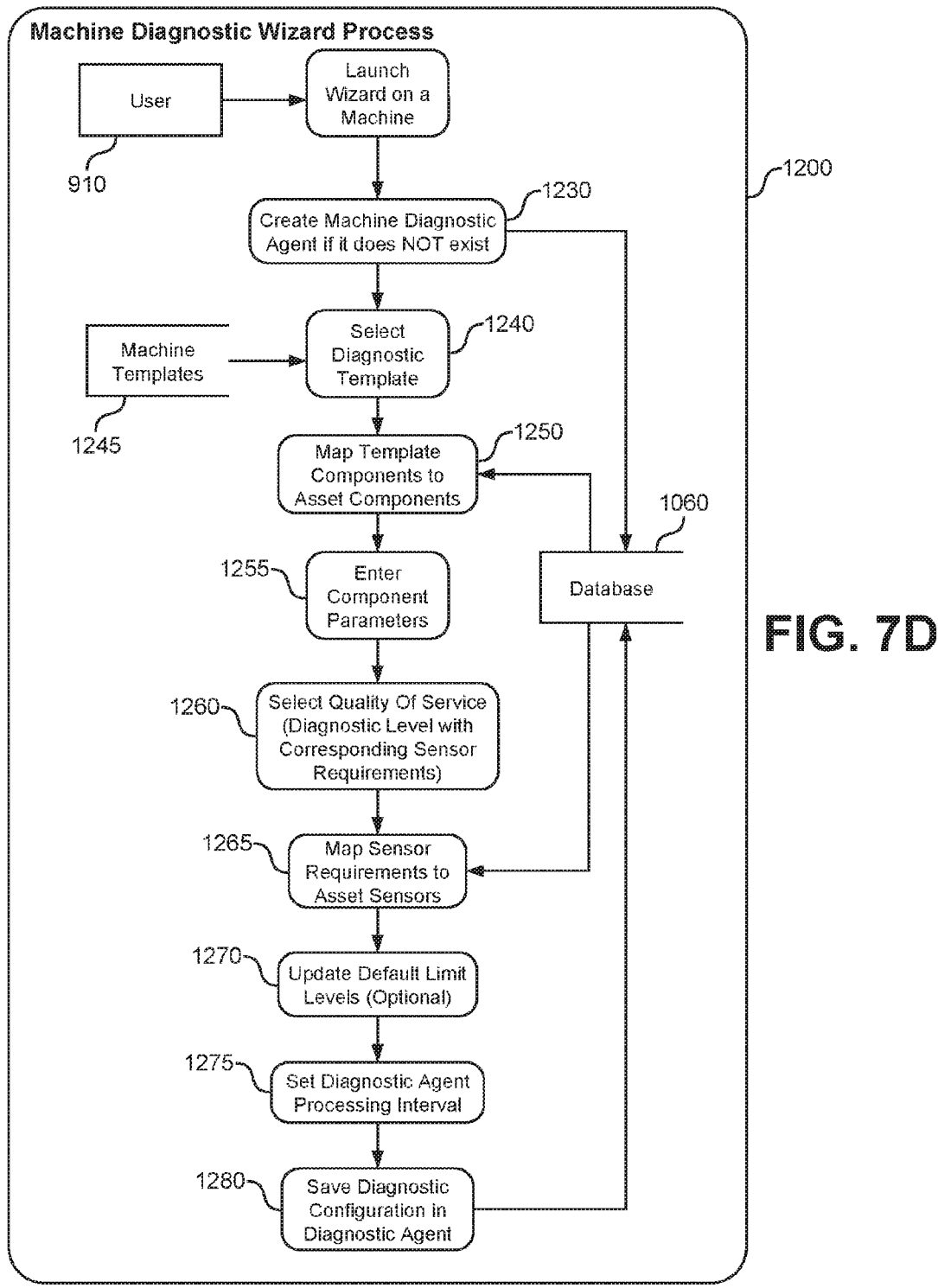
Figure 7E:
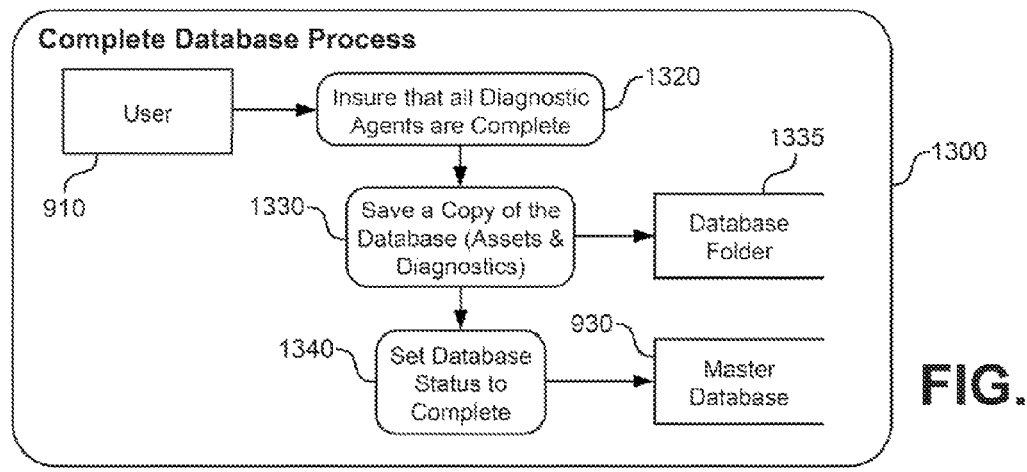
Figure 7F:
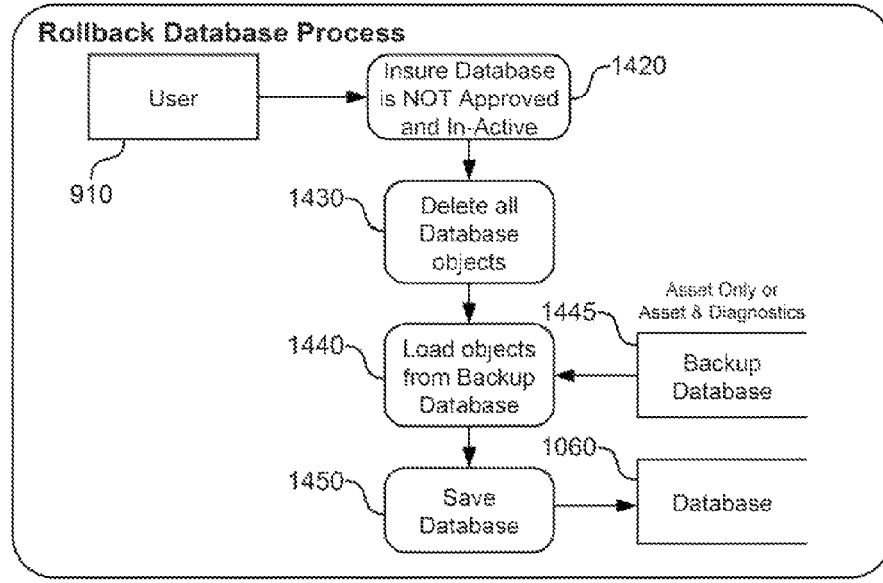

Downloader 185 is a single-instance application that will update user database lists (Startup Process 600 of FIG. 6A); retrieve database information (Selection Process 700 of FIG. 6B); and update local database servers (Update Process 800 of FIG. 6C).

Startup Process

Downloader 185 connects to long-term storage 630, using one or more user accounts 610. Based on account access authorization, Downloader 185 gets a list of authorized databases from long-term storage system 630 and compares at step 620 that list with the local copy of the remote database list 650. Finally, Downloader 185 updates the local remote database list by adding new databases and deleting removed databases at 640.

Selection Process

A user reviews the database list and at 710 selects a database to retrieve information from. The user identifies criteria at 710 for information to be accessed (e.g., entire data set). Downloader 185 updates the database list with the download criteria at 720 and provides access to the database at 730.

Update Process

An application 800 changes data in a database. Downloader 185 searches all databases 650 for changes to database files at 820. Downloader 185 updates the database update lists 830 and downloads at 850 the update files to each database's distribution folder 880. Downloader 185 applies changes at 860 to all copies of each local database by merging the update files into the database 870. Downloader 185 deletes update at 890 files after all updates have been completed. See Table 1, above, for sample update types.

Configurator—See FIGS. 7A-7F for as flow chart showing the process steps of the configurator.

Configurator 150 consists of a software module enabling the user to perform several tasks necessary for installation, configuration, and operation of the condition based monitoring system. Configurator 150 allows the user to: 1) Create, update, delete components of the condition based monitoring system; 2) Determine number of sensors 60 required and placement thereof; 3) Generate a list of required components to facilitate condition based monitoring of a machine or plurality of monitored asset 70; and 4) Generate suggested configuration of data analysis software.

Configurator 150 is a multi-instance program that will: Allow the user to create, connect to, and edit a database (Open Database Process 900 of FIG. 7A); Allow the user to manage monitored assets (Create Asset Process 1000 of FIG. 7B); Allow the user to manage diagnostic parameters (Build Diagnostics Process 1100 of FIG. 7C); Allow the user to create diagnostic agents (Machine Diagnostic Wizard Process 1200 of FIG. 7D); Allow the user to complete a database (Complete Database Process 1300 of FIG. 7E); and Allow the user to rollback a database (Rollback Database Process 1400 of FIG. 7F).

Open Database Process

Master Database 930 houses a list of available databases and database configuration parameters. Via configurator 150, user 910 accesses at 920 the list of available databases. Configurator 150 allows user 910 to edit the configuration of an existing database from the database list at 960. Master Database 930 determines the user's access based on the user's privileges and database information. The databases are managed by a database server program 950.

Create Asset Process

Available asset types are stored in an Asset Taxonomy (MIMOSA is one example but others exist well known to those of skill in the art). Configurator 150 provides user 910 access to an Asset Taxonomy database 1030. User 910 may select an existing asset type at 1020 or create a new asset type at 1040 (e.g., site, asset, or transducer) in order to add an asset instance at 1050 to a database 1060 (created or accessed via the Configurator's Open Database Process 900). Configurator 150 also allows user 910 to establish the relationship(s) between asset instances. Once created, the asset is added to the Asset Hierarchy in database 1060 and, if a new type, the list of asset types.

Build Diagnostics Process

A given database 1060 will house a list of diagnostic agents (diagnostic agents are comprised of several parts including device sampling configuration objects, symptoms and recommendation objects, and layout objects). Via configurator 150, user 910 accesses the list of diagnostic agents. Configurator 150 will compile all agents which creatures all objects needed to facilitate monitoring. User 910 uses a diagnostic process to insure all diagnostic agents are configured at set 1120. The process then saves a copy of the database at 1130 in the database folder 1140. Next at step 1150 diagnostic configurations are loaded from all agents from database 1060. At step 1160 the process builds data acquisition device sampling configuration objects and then builds diagnostic agent symptom and recommended objects at 1180. A process then builds a machine user interface layer objects at 1190 and sets the status of all diagnostic agents to complete at 1195.

Machine Diagnostic Wizard Process

User 910 launches a wizard 1200 on a machine. Configurator 150 checks a database 1060 for existing diagnostic agents and creates one if necessary at 1230. User 910 selects a diagnostic template 1240 from the machine templates available at 1245. Configurator 150 maps, at 1250, the template components to the monitored asset components according to information stored in database 1060. User 910 enters component parameters at 1255. User 910 selects the appropriate diagnostic level and sensor requirements at 1260. Configurator 150 maps at 1265, the requirements to the monitored asset sensors 60. Configurator 150 allows user 910 to update the default limit levels at 1270 if user 910 would like to do so. Configurator 150 sets the diagnostic agent processing interval at 1275. Configurator 150 saves the diagnostic configuration in the diagnostic agent in database 1060 at 1280.

Complete Database Process

User 910 sets database status to complete in process 1300, this indicates that database 1060 is ready for monitoring. Configurator 150 ensures that all diagnostic agents are complete at 1320. Configurator 150 saves a copy of the database assets and diagnostics to a database folder 1335 at 1330. Configurator 150 then sets the database status to complete at step 1340 in Master Database 930.

Rollback Database Process

User 910 initiates a database rollback. Configurator 150 ensures that the database 1060 has not been approved and is inactive at 1420. Configurator 150 deletes all database objects at 1430. Configurator then loads at 1440 objects from a backup database 1445 and, at 1450, saves database 1060 to the database server.

Figure 8A:
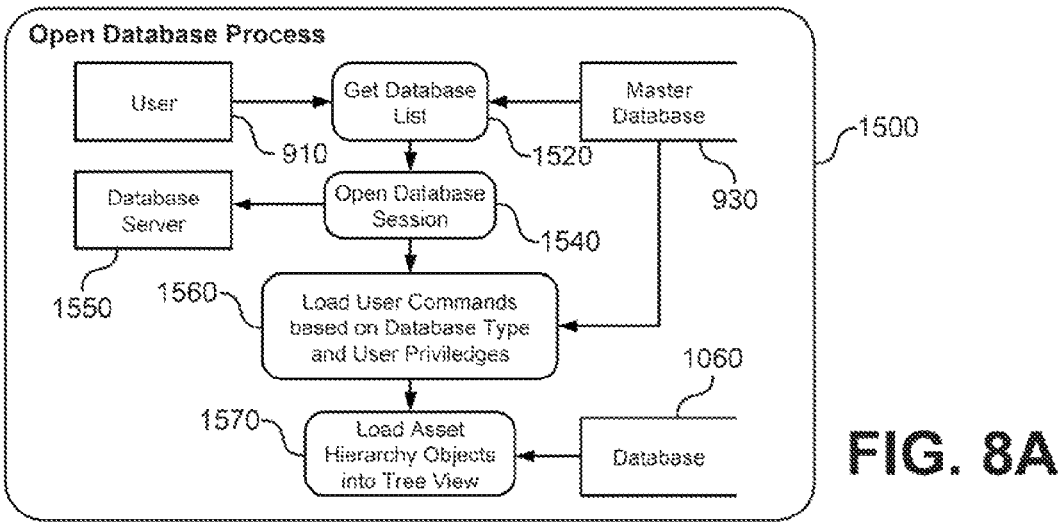
FIGS. 8A-8C are flow charts showing the process steps for an explorer program according to a preferred embodiment of the invention.
Figure 8B:
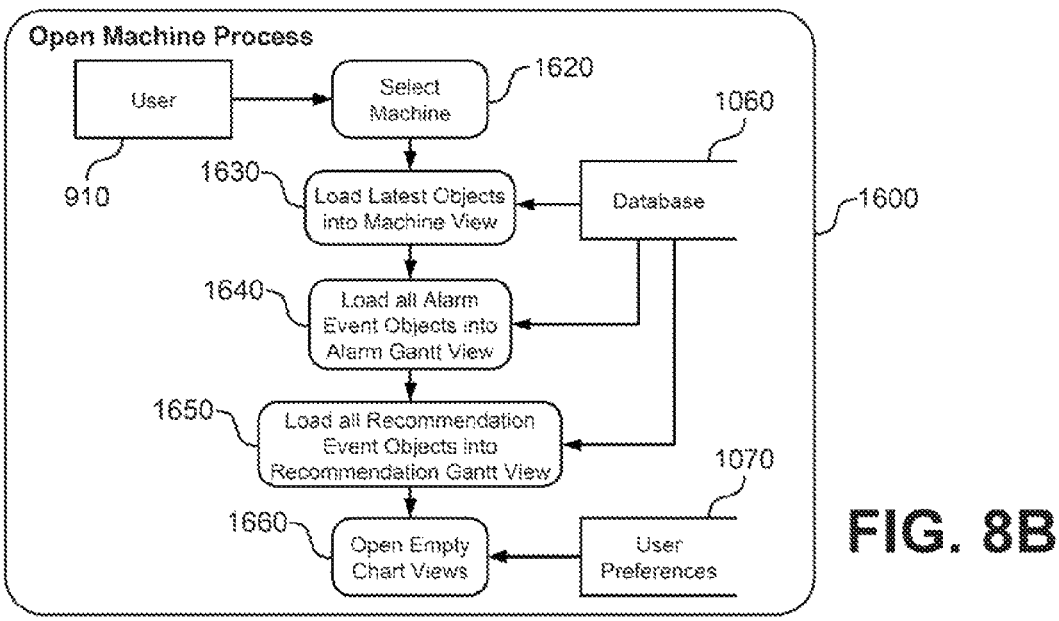
Figure 8C:
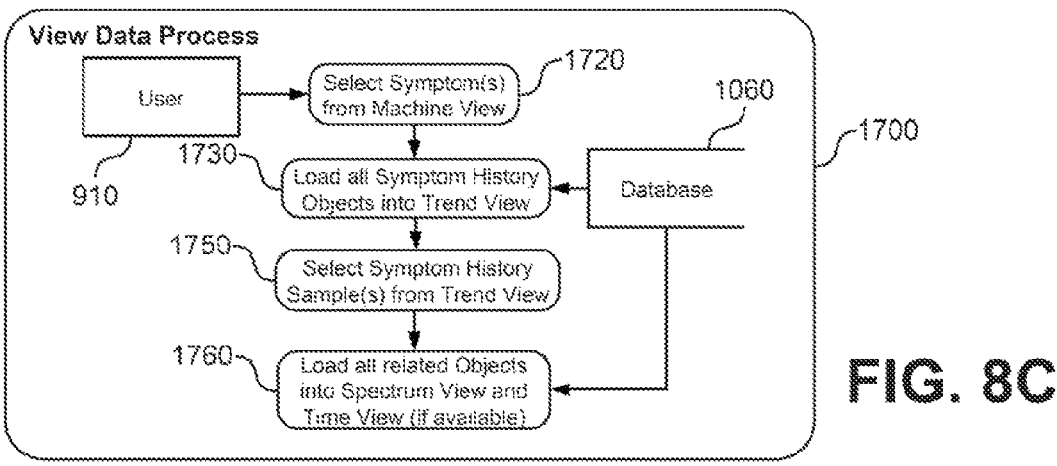

Explorer—See FIGS. 8A-8C for flow charts showing the process steps of Explorer 170.

Explorer 170 is a multiple-instance program that will allow the user to connect to a database (Open Database Process 1500 of FIG. 8A); allow the user to connect to a monitored asset (Open Machine Process 1600 of FIG. 8B); and allow the use to review data (View Data Process 1700 of FIG. 8C).

Open Database Process

Master Database 930 houses a list of available databases configuration parameters. Via explorer 170, user 910 accesses the list of available databases. Explorer 170 allows user 910 to select at 1540 a database to access from database server 1550. Master Database 930 determines the user's access based on the user's privileges and database information. Databases 1060 are stored on a database server. Explorer 170 will load appropriate user commands at 1560 and load asset hierarchy objects at 1570.

Open Machine Process

Upon accessing a particular database, Explorer 170 will allow user 910 to access or select any monitored asset 70 at 1620 (e.g., a machine). Explorer 170 will load objects associated with monitored asset 70 for the user 910 to view at 1636. Explorer 170 allows user 910 to review alarm event objects, view alarm data, review recommendations at 1650, and open empty charts at 1660. User 910 may also set default preferences 1670 for empty charts and send new alarm configuration data via the Explorer 170.

View Data Process

Upon accessing a particular monitored asset, Explorer 170 will allow user 910 to access data associated with monitored asset 70. User 910 will select symptom(s) to review at 1720. Explorer 170 loads all objects and allows user 910 to view the associated data at 1730 from database 1060. User 910 may select symptom samples at 1750 and Explorer 170 will load all related objects unto appropriate views at 1760.

Figure 9A:
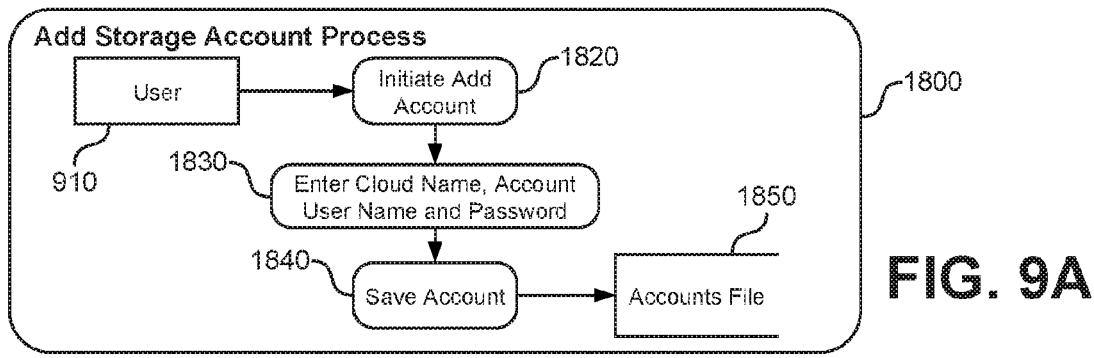
FIGS. 9A-9C are flow charts showing the process steps for a dashboard program according to a preferred embodiment of the invention.
Figure 9B:
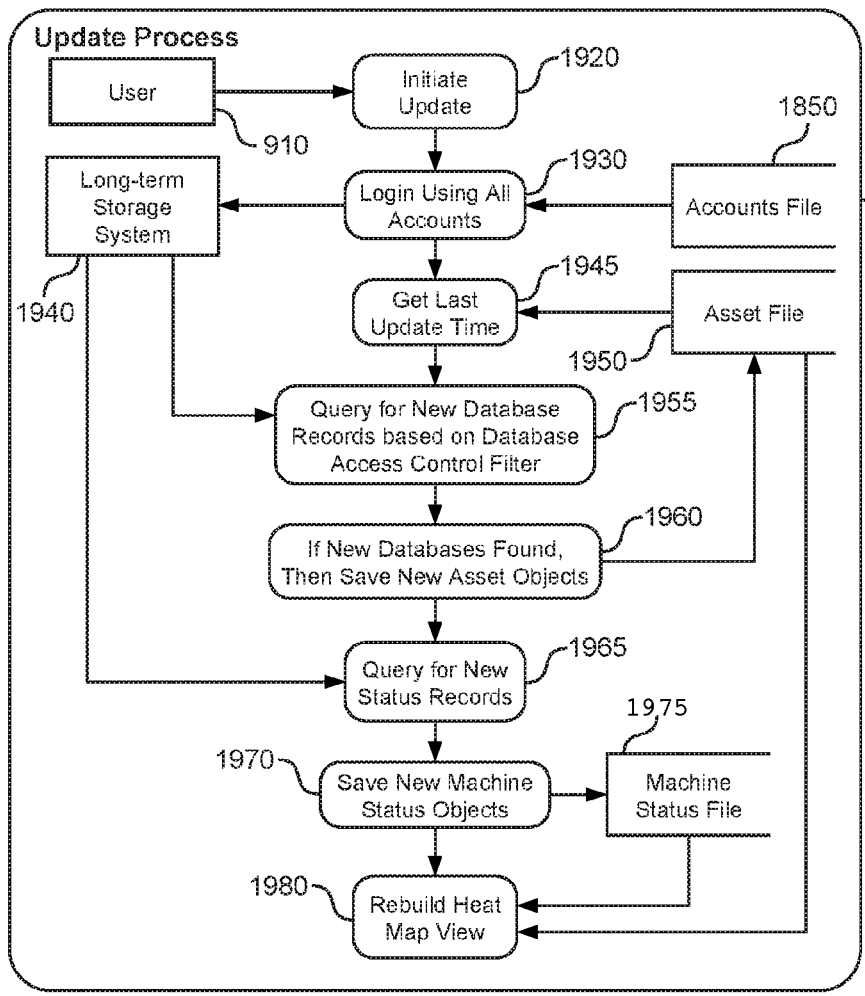
Figure 9C:
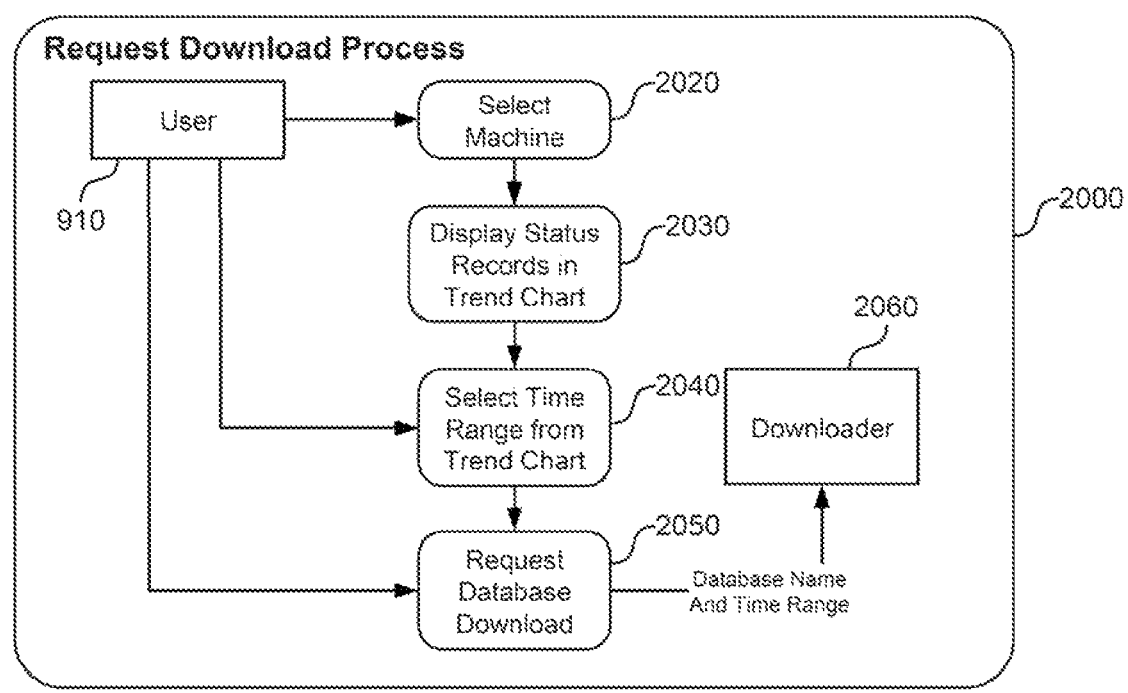
Figure 10A:
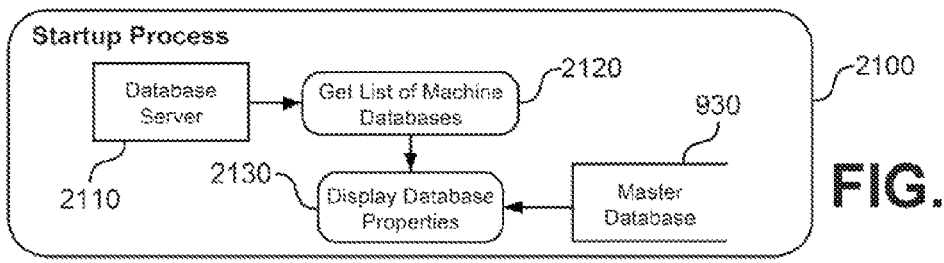
FIGS. 10A-10G are flow charts showing the process steps for a manager program according to a preferred embodiment of the invention.
Figure 10B:
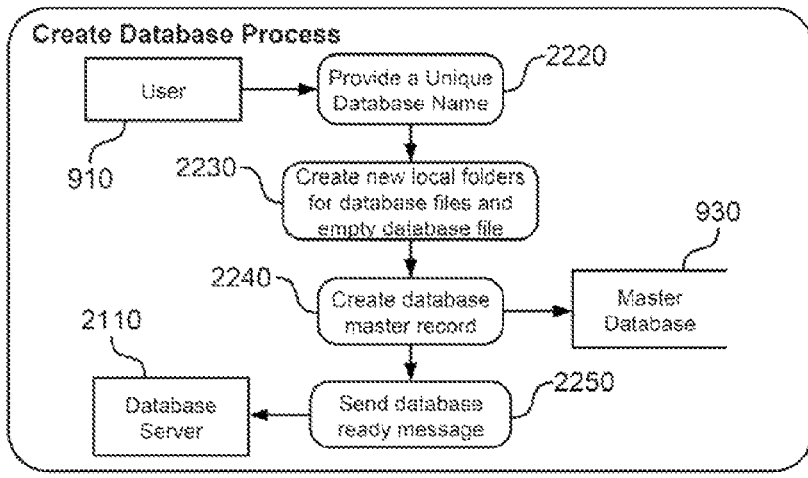
Figure 10C:
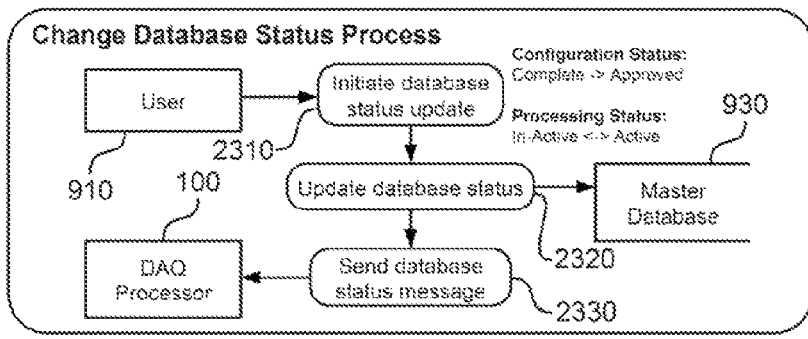
Figure 10D:
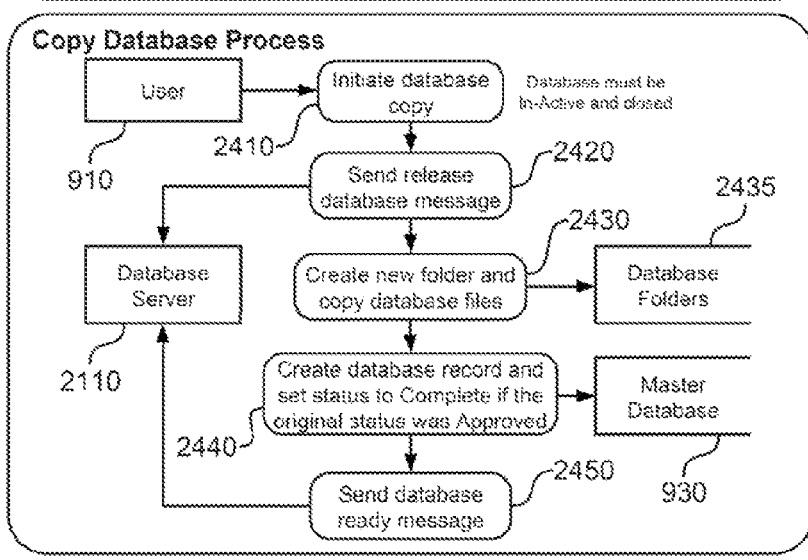
Figure 10E:
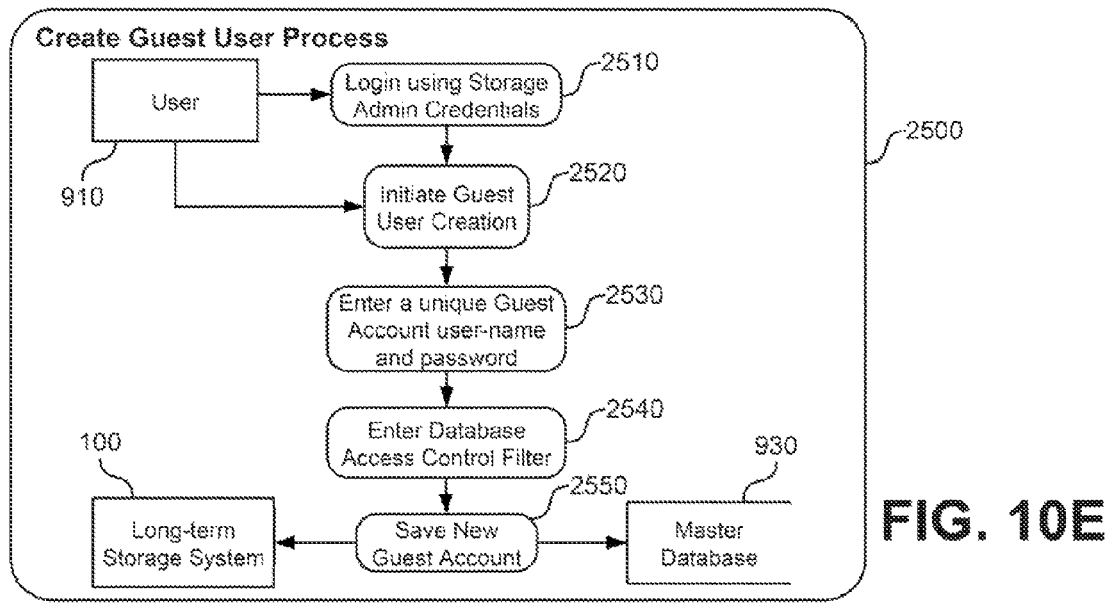
Figure 10F:
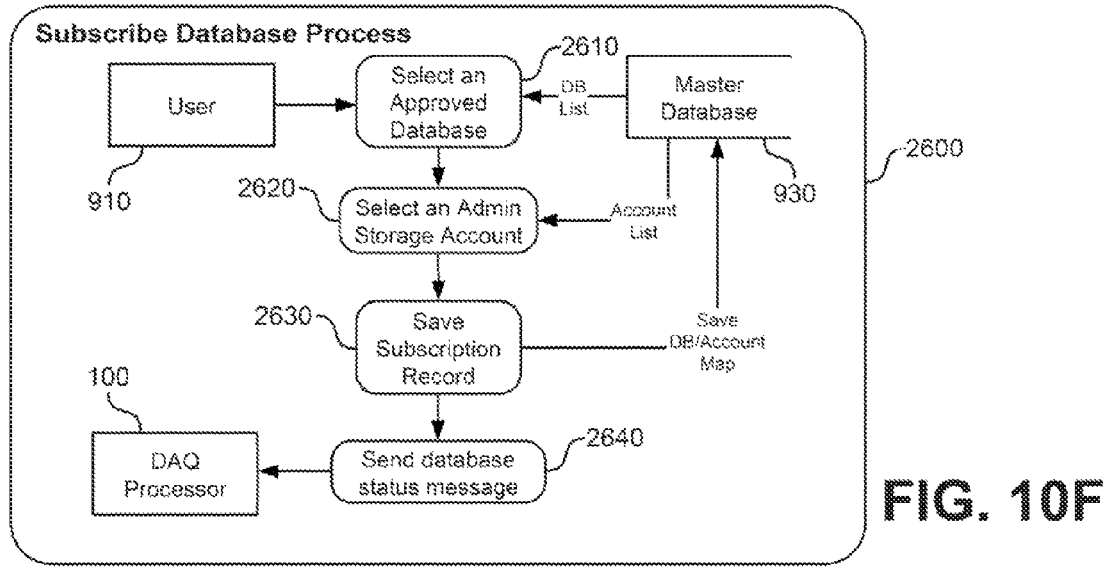
Figure 10G:
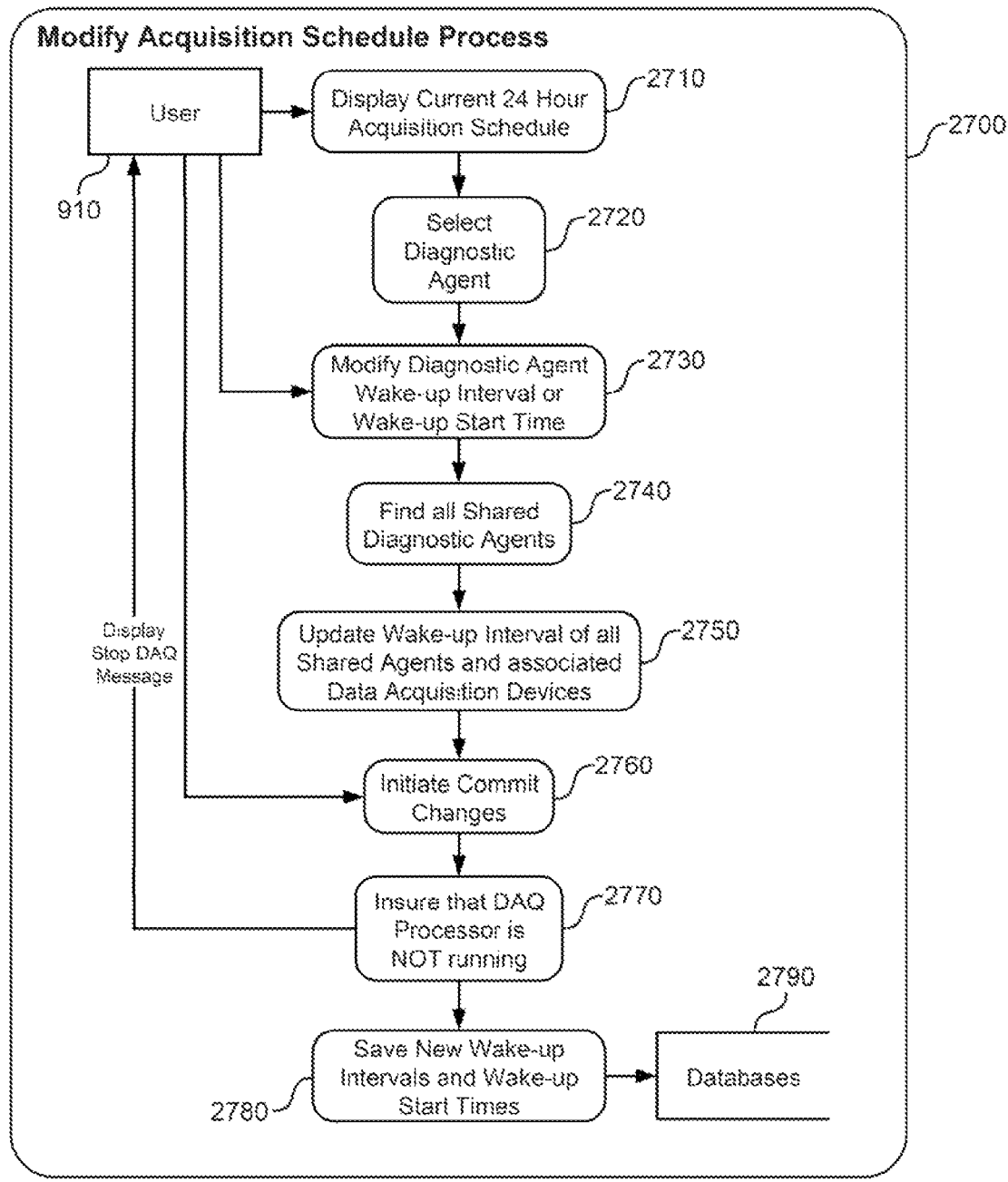

Dashboard—See FIGS. 9A-9C for a flow chart showing the process steps of dashboard 180.

Dashboard 180 is a single-instance program that will allow the user to create long term storage access accounts (Add Storage Account Process 1800 of FIG. 9A); allow the user to initiate updates (Update Process 1900 of FIG. 9B); and allow the user to request a database download (Request Download Process 2000 of FIG. 9C).

Add Cloud Account Process

User 910 initiates the process to add a long term storage user account 1820. Dashboard 180 assigns the account to the appropriate long term storage. User 910 enters the account name and password at 1830. Downloader 185 saves the long term storage user account at 1840 in the long term storage accounts file 1850.

Update Process

User 910 initiates an update at 1920. Dashboard 180 logs in at step 1930 to the long term storage system(s) 1940 using all accounts from the long term storage accounts file 1850. Dashboard 180 gets the latest update time 1945 from an asset file 1950. Dashboard 180 queries for new database records at 1955 and if new databases are found saves new asset objects at 1960. Dashboard 180 queries the long term storage system(s) at 1965 for new status records. Dashboard 180 saves the new machine status objects at 1970 to the machine status file at 1975 and rebuilds the user interface at 1980.

Request Download Process

User 910 selects, at 2030, a monitored asset 70. Dashboard 180 displays the status records at 2030. User 910 selects an appropriate time range for download at 2040 and requests a download at 2050. Dashboard 180 sends a message to Downloader 185 to initiate the download at 2060.

Manager—See FIGS. 10A-10G for a flow chart showing the process steps of Manager 160.

Manager 160 is a single-instance program that will: Retrieve lists(s) of monitored assets from database server(s) and retrieve their properties for display from the Master Database (Startup Process 2100 of FIG. 10A); Allow user to create databases (Create Database Process 2200 of FIG. 10B); Allow user to update database status (Change Database Status Process 2300 of FIG. 10C); Allow user to copy databases (Copy Database Process 2400 of FIG. 10D); Allow user to create guest user accounts (Create Guest User Process 2500 of FIG. 10E); Allow user to subscribe a database to log-term storage (Subscribe Database Process 2600 of FIG. 10F); and Allow user to modify the data acquisition schedule (Modify Acquisition Schedule Process 2700 of FIG. 10G).

Startup Process

Manager 160 will retrieve list(s) of monitored assets 70 from database server(s) at 2120. Manager 160 will retrieve database properties from Master Database 930 and display the database properties to user 910 at 2130.

Create Database Process

User 910 will provide a unique database name at 2220. Manager 150 will create new local folders from database files and empty database files on the database server at 2230.

Manager 160 will create a database master record at 2240 on Master Database 930 and send a database ready message at 2250 once the database has been created to a database server 2110.

Change Database Status Process

Manager 160 will allow user 910 to change the status of the database (e.g., configuration status or processing status) at 2310. Manager 160 will update the database status at 2320 on Master Database 930 and send as database status message 2330 to DAQ Processor 100.

Copy Database Process

User 910 initiates a database copy process 2410. Manager 160 will contact database server 2110 to release the database at 2420. Manager 160 creates a new folder and copies, at 2430, database files to a new location 93, at 2435. Manager 160 then creates a database record at 2440 on Master Database 930, at 2440. Manager 160 also sets the copied database status to "Complete" if the original database status was "Approved." Manager 160 then sends a database ready message 2450 to database server 2110.

Create Guest User Process

User 910, with appropriate credentials, logs in 2510. Manager 160 verifies credentials. User 910 initiates the guest user creation module 2520 and enters a unique guest user account name and password at 2530. The user 910 provides database access information at 2540. Manager 160 saves the new guest account at 2550 and updates Master Database 930 and long term storage 120.

Subscribed Database Process

A user 910 selects an approved database at 2610 from master database 930. manager 160 selects an administrative storage account at 2620 from the account list in master database 930. manager 160 then saves a subscription record to master database 930 at step 2630. Next manager 160 sends database status message to 2640 to DAQ processor 100.

Modify Acquisitions Process

User 910 reads a current 24 hour acquisitions schedule displayed at 2710 by a manager 160. User 910 then selects a diagnostic agent at 2720. Which is modified by user 910 to a certain wake up interval, wake up start time. Manager 160 finds all shared diagnostic agents at step 2740 and then updates the wake up interval of all shared agents in associated acquisition devices at step 2750. User 910 then initiates commit changes at 2760 and manager 160 insures that DAQ Processor 100 is not running at step 2770. Manager 160 then saves new wake up intervals and wake up start times at 2780 to databases 2790.

Figure 11A:
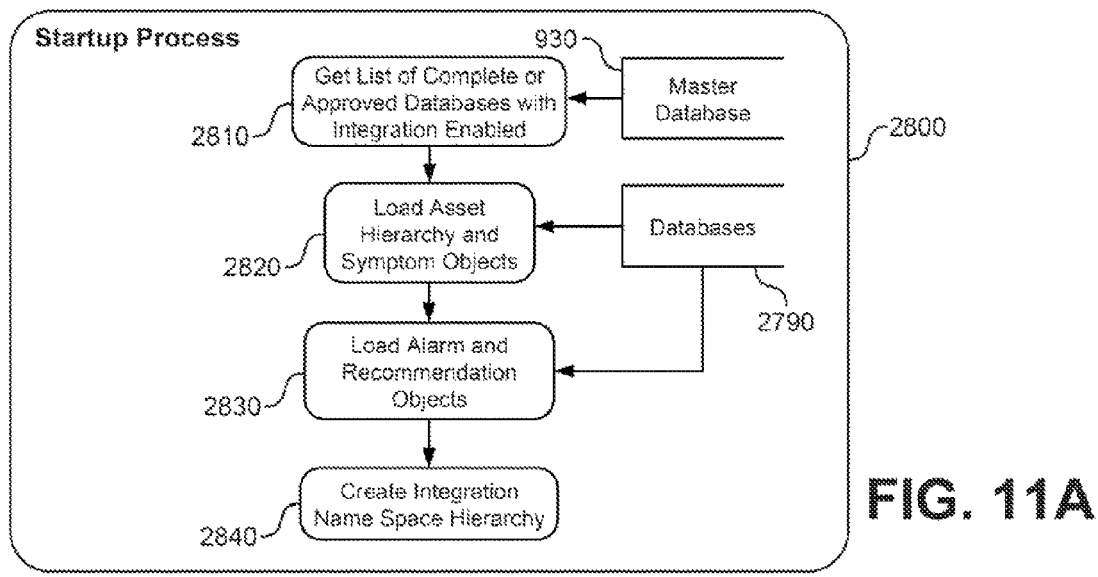
FIGS. 11A and 11B are flow charts showing the process steps for an integration server program according to a preferred embodiment of the invention.
Figure 11B:
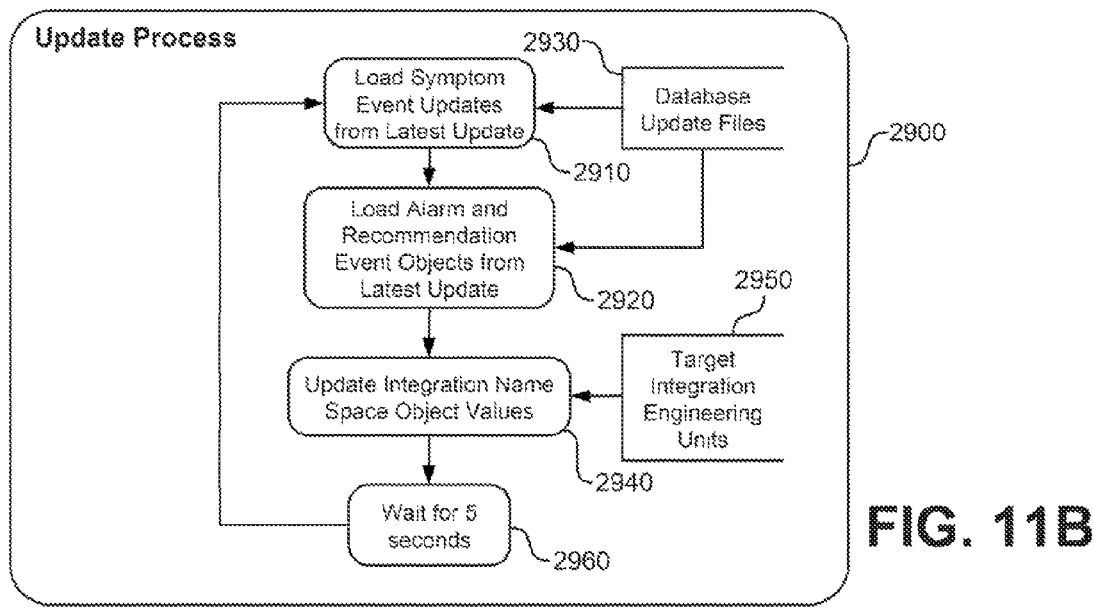

Integration Server—See FIGS. 11A, 11B for a flow chart showing the process steps of the integration server.

Integration server 190 is a single-instance program that will facilitate communication between database or databases 30 and other enterprise systems 195 (e.g., CMMS, EAM, ERP) via a standard protocol (e.g. OPC, MIMOSA, SOA 2800); and create object hierarchy for enterprise systems (Startup Process 2800 of FIG. 11A); and continuously update object values for enterprise system client applications (Update Process 2900 of FIG. 11B).

Startup Process

Integration Server 190 will get a list of databases from master database 930 which have been designated for communication with other enterprise systems (e.g., CMMS). Integration Server 190 loads the asset hierarchy, symptom objects at 2820 from database 2790, alarm, and recommendation objects from the appropriate database(s) at 2830. Integration Server 190 creates an appropriate hierarchy according to the requisite protocol (e.g., OPC) at 2840.

Update Process

Integration Server 190 loads at step 2910 symptom event updates, alarm at step 2920, and recommendation event objects from latest database update files 2930. Integration Server 190 updates at 2940 the object values according to a requisite protocol and a target engineering unit system 2950 (e.g., Metric). Integration Server 190 runs the update process continuously or on a defined interval 2960.

As can be seen from the above discussion, the condition based monitoring solution provides the operator with data on the operating condition of balance of plant equipment and highlights out-of-norm condition in near real-time in order to minimize down time, minimize maintenance costs by indicating the need for repair before a catastrophic failure, and does so without the need for increasing the size of an existing maintenance staff. Such a solution provides data to be communicated to experts for analysis and maintenance recommendations. A condition based monitoring solution further provides an operator with the ability to verify a machine returns to efficient operating conditions following as maintenance or repair event.

The method and system of the current invention may be employed in conjunction with any of a variety of diagnostic engines or systems appropriate to the machine or device involved. Further, the method and system may be integrated into existing software and control systems already in place at an enterprise or facility. In addition, the method may be scalable to several machines, and employed in a single, mobile unit. Further, the system of the present invention may be utilized on other environments that require levels of monitoring, such as infrastructure, bridges, train tracks, waterways, electrical grid, buildings and the like.

Although described with reference to preferred embodiments of the invention, it should be readily understood that various changes and/or modifications can be made to the invention without departing from the spirit thereof. In general, the invention is only intended to be limited by the scope of the following claims.

We claim:

1. A method for condition based monitoring of an asset comprising:

sensing time sequenced operational information about the asset through at least one sensor associated with the asset, wherein the operational information encompasses a plurality of time sequenced operational parameters of the asset;

transferring the operational information to a first storage device;

dividing the operational information into a plurality of data packets, with each data packet containing a portion of the operational information;

transmitting the plurality of data packets from a first storage device into respective mapped locations within multiple, dedicated databases provided in at least one remote storage device;

subsequently retrieving select ones of the plurality of data packets from one or more of the mapped locations;

conducting an analysis, with a processor, on the time sequenced operational information from the select ones of the plurality of data packets for a predetermined operational feature of the asset; and adjusting a maintenance schedule for the asset or initiating a repair event on the asset, based on the analysis, whereby down time or maintenance costs of the asset are reduced.

2. The method of claim 1, wherein each said portion of the operational information is directed to a respective one of the plurality of operational parameters.

3. The method of claim 1, further comprising: receiving user criteria for a desired analysis, wherein the select ones of the plurality of data packets is determined based on the user criteria.

4. The method according to claim 1, wherein sensing the time sequenced information includes measuring vibrations caused by the asset with the at least one sensor to create an analogue signal and converting the analogue signal into a digital signal containing the information.

5. The method according to claim 1, further comprising: producing an alert when an error is determined to exist for the predetermined operational feature.

6. The method according to claim 1, further comprising: developing a diagnostic configuration associated with the asset, wherein diagnosing the predetermined operational feature of the asset includes retrieving data based on the diagnostic configuration and analyzing the data based on the diagnostic configuration using user specific software.

7. The method according to claim 6, further comprising: loading user specific software on a portable computing device by only loading a limited portion of the data on the portable computing device while analyzing the data to diagnose the asset.

8. The method according to claim 1, wherein the plurality of data packets are object oriented databases and transmitting the plurality of data packets from the first storage device to the at least one remote storage device includes sending the plurality of data packets through a group of networked computers.

9. The method according to claim 8, wherein the at least one remote storage device constitutes cloud storage.

10. A system for monitoring operational conditions of an asset comprising:
   at least one sensor provided to monitor one or more operational parameters of the asset;
   a data acquisition device for collecting time sequenced operational information from the at least one sensor;
   a local storage device;
   a transmitter for transmitting the operational information to the local storage device;
   a processor configured to divide the operational information into a plurality of data packets each containing a portion of the operational information, transmit the plurality of data packets from the local storage device into respective mapped locations within multiple, dedicated databases provided in at least one remote storage device; and
   software configured to retrieve select ones of the plurality the data packets from one or more of the mapped locations, and analyzing the time sequenced operational information from the select ones of the plurality of data packets during an analysis of a predetermined operational feature of the asset and adjust a maintenance schedule for the asset or initiate a repair event on the asset, based on the analysis, whereby down time or maintenance costs of the asset are reduced.

11. The system according to claim 10, wherein each portion of the operational information is directed to a specific operational parameter of the asset.

12. The system according to claim 10, wherein at least one sensor measures vibrations caused by operation of the asset.

13. The system according to claim 10, further comprising: a portable computing device provided with the software and having limited computing and data transmission ability for loading only a limited portion of the data on the portable computing device while analyzing the data to diagnose the asset.

14. The system according to claim 10, wherein the multiple, dedicated databases are object oriented type databases linked to a group of networked computers through which the plurality of data packets are transmitted.

15. The system according to claim 10, wherein the at least one sensor is attached to one machine of a group of machines being monitored.

16. The system according to claim 10, wherein the at least one remote storage device constitutes cloud storage.

* * * * *